UNITED STATES PATENT OFFICE 2,537,192

TABLE SIRUP AND METHOD OF MAKING THE SAME

Arthur A. Sebring, Redwood Falls, Minn.

No Drawing. Application September 13, 1948, Serial No. 49,127

5 Claims. (Cl. 99—142)

This invention relates to a palatable table syrup having the taste and consistency of natural maple syrup and to the process of making the same.

It is an object of my invention to provide a table syrup of high quality which may be produced at low expense and which has the taste and other qualities of natural maple syrup.

A further object is the provision of simple and efficient method of preparing my new table syrup which is well adapted for commercial use as well as home use.

A further object is the production of an improved, tasty table syrup from inexpensive ingredients including as an essential element, a saccharine extract from portions of a food crop product which are normally discarded.

These and other objects and advantages of my invention will be more apparent from the following description relating to the product and the method of manufacturing the same.

I have unexpectedly discovered that the natural sugars retained in dry corn cobs, after the corn has been shelled therefrom and after boiling and concentration with water, resemble very closely, in taste characteristics, natural maple sugar.

When an infusion or extract of the natural syrup from dry corn cobs is mixed with a relatively small amount of commercial sucrose such as brown sugar, the desired syrupy consistency and natural color of maple syrup is obtained with an improvement in the flavor because of the additional saccharine content and with an even closer taste similarity of the product to natural maple syrup.

In making my improved table syrup, I utilize natural corn cobs, preferably in dry state, from which the corn has been shelled and these preferably, are broken up into short sections and mixed with a quantity of water, adequate to more than cover the cobs in a kettle or other utensil, for boiling. For example, from six corn cobs of normal size (either field corn or sweet corn), one quart of extract may be obtained by boiling approximately one and one half quarts of water with the cobs for a period of time to evaporate the liquid approximately 50% to leave one quart.

To the extract or infusion so formed, one pound of brown sugar may be added to make a table syrup of weaker flavor or preferably two quarts of the extract are taken with one pound of brown sugar thoroughly dissolved and admixed therewith, preferably during the last stages of the boiling operation.

The extract is preferably strained before addition of the brown sugar. The brown sugar supplies the requisite additional sucrose content and further, colors the resultant syrup to a shade quite similar to the natural light brown shade of maple syrup.

My product so made, unexpectedly resembles closely in taste, the flavor of natural maple syrup. The consistency is quite similar to natural maple syrup and the sucrose content is also quite close to that of the natural maple product.

Apparently, the specific sugars retained in dry corn cobs are different than the sugars contained in the various elements comprising the corn kernels. In any event, the taste characteristics of the extract obtained from the dried corn cobs, is surprisingly similar to that of maple syrup and my method definitely contemplates the use of corn cobs alone with no corn kernels attached thereto and preferably, the use of corn cobs where the kernels have been shelled some period before using the cobs and where the cobs are in dry condition.

At the present time, outside of the use of extra large selected corn cobs for pipes and in case of fuel emergency, the sporadic use of cobs for low grade fuel, this bulky portion of the natural corn is thrown away or otherwise wasted.

Large quantities of corn cobs are available at extremely low price and furnish a very inexpensive, delectable extract for the manufacture of a very palatable syrup having the characteristics of natural maple sugar.

While I have specified as the particular commercial sucrose utilized in a mixtutre with my extract, it of course, will be understood that various other commercial sugars may be substituted for the brown sugar plus a coloring agency, all in accordance with my invention.

It will further be understood that the proportions set forth herein are merely exemplary and may be varied within a considerable range to produce palatable syrups of various consistencies and extract strength.

Good results have been obtained where only one pound of brown sugar or other commercial sucrose has been dissolved in as high as three and one half quarts of extract, concentrated by boiling down from 30 to 40% of the original volume of the water used.

What I claim is:

1. The method of making a table syrup having the characteristic flavor of natural maple syrup, which consists in boiling a mixture of water and dry corn cobs until the sugars are thoroughly extracted from the cobs and then continuing the boiling to at least partially concentrate the extract, then adding to the extract a relatively small percentage by volume of a commercial sucrose to increase the sucrose content of the product and to impart a viscosity commensurate with that of natural maple syrup.

2. The method of making a table syrup having the characteristic flavor of natural maple syrup, which consists in breaking up a multiplicity of dry corn cobs, boiling a mixture of water and said broken dry corn cobs until the sugars are thoroughly extracted from the cobs and then continuing the boiling to at least partially concentrate the extract, then adding to the extract while the latter is hot, a relatively small proportion by volume of a commercial sucrose to increase the sucrose content of the product and to impart a viscosity commensurate with that of natural maple syrup.

3. The method of making a table syrup having the characteristic flavor of natural maple syrup, which consists in boiling a mixture of water and dry corn cobs until the sugars are thoroughly extracted from the cobs and then continuing the boiling to at least partially concentrate the extract through reduction of the liquid content by more than 30% of its volume, then adding to the extract while still hot, a relatively small quantity of commercial sucrose within a range of from one pound of sucrose to one quart of extract, to one pound of sucrose to three quarts of extract and completely dissolving said sucrose in said extract.

4. An improved table syrup comprising a saccharine aqueous extract of dried corn cobs having dissolved therein, a relatively small percentage of commercial sucrose.

5. An improved table syrup consisting in an aqueous saccharine extract of dried corn cobs and dissolved therein a quantity of brown sugar in the range of proportions of from one quart of extract with one pound of brown sugar to three quarts of extract with one pound of brown sugar.

ARTHUR A. SEBRING.

REFERENCES CITED

The following references are of record in the file of this patent:

UNITED STATES PATENTS

| Number | Name | Date |
| --- | --- | --- |
| 56,673 | McLean | July 24, 1866 |
| 261,315 | Daily | July 18, 1882 |
| 1,037,766 | Hogan | Sept. 3, 1912 |

OTHER REFERENCES

"Structure and Composition of Foods," by Winton, vol. IV, John Wiley and Sons, Inc., New York, 1939, page 27.